United States Patent [19]

Yabuta et al.

[11] Patent Number: 5,124,399
[45] Date of Patent: Jun. 23, 1992

[54] PROCESS FOR PREPARATION OF SELF-CURING RESIN

[75] Inventors: Motoshi Yabuta, Hatano; Yasushi Nakao; Yoshiyuki Yukawa, both of Hiratsuka, all of Japan

[73] Assignee: Kansai Paint Company, Limited, Amagasaki

[21] Appl. No.: 709,460

[22] Filed: Jun. 3, 1991

[30] Foreign Application Priority Data

Jun. 4, 1990 [JP] Japan .................................. 2-147091

[51] Int. Cl.$^5$ ............................................. C08L 75/04
[52] U.S. Cl. .................... 524/555; 525/328.2; 528/45
[58] Field of Search .................... 524/555; 525/328.2; 528/45

[56] References Cited

U.S. PATENT DOCUMENTS 4,301,257 11/1981 Zengel et al. .................... 525/328.2

Primary Examiner—Maurice J. Welsh
Attorney, Agent, or Firm—Armstrong & Kubovcik

[57] ABSTRACT

The present invention provides a process for preparing a self-curing resin having a blocked isocyanate group and a hydroxyl group in the molecule from a polymer 500 to 50000 in number average molecular weight and having a tertiary amino group and/or a quaternary ammonium group, and at least two isocyanate groups in the molecule, the process comprising the steps of partly blocking the isocyanate groups in the skeleton of the polymer, and reacting the remaining unblocked isocyanate groups with an alkanolamine to introduce hydroxyl groups into the polymer.

4 Claims, No Drawings

PROCESS FOR PREPARATION OF SELF-CURING RESIN

The present invention relates to a novel process for preparing a self-curing resin in the form of a polymer having within the molecule a blocked isocyanate group and a hydroxyl group which are reactive groups complementary to each other. The resin is useful especially as a resin for aqueous coating compositions.

An aqueous self-curing composition is already known which is prepared from an unsaturated monomer containing a blocked isocyanate group, an unsaturated monomer containing a hydroxyl group and an unsaturated monomer containing a tertiary amino group and/or a quaternary ammonium group, by copolymerizing these monomers to introduce the complementary reactive groups into the molecule, subsequently neutralizing the tertiary amino group with an acid or the like and dissolving the resulting copolymer in a mixture of hydrophilic organic liquid and water (Unexamined Japanese Patent Publication 1989-87606).

However, the composition has a drawback. Since the specified styrene derivative to be used as the blocked isocyanate-containing unsaturated monomer is not always highly polymerizable, an insufficient polymerization degree will result if an azo polymerization initiator is used. Alternatively if a peroxide or dialkyl peroxy carbonate initiator is used to achieve a higher polymerization degree, there arises a need to effect polymerization at a high temperature of at least 100° C., with the result that the blocking agent becomes dissociated during the polymerization, while permitting the presence of the tertiary amino group to cause the isocyanate group to react with the hydroxyl group to entail an increased viscosity or gelation. Furthermore, depending on the kind of blocking agent used, various problems arise. For example, when the isocyanate-containing unsaturated monomer used is one blocked with an oxime blocking agent, the blocking agent is prone to dissociation even at a low temperature of about 100° C., consequently permitting the isocyanate-containing monomer to react with the amine monomer during the polymerization reaction to cause gelation. Further if the isocyanate-containing polymerizable monomer used is one blocked with a phenol or oxime blocking agent, the polymerization reaction, which must be conducted at a high temperature (about 120° to 140° C.), results in the drawback of giving a markedly colored copolymer. Further if the monomer used is one blocked with other agent which is higher in dissociation temperature, the self-curing resin obtained needs to be heated to a further higher temperature (at least about 170° C.) for curing and is therefore not curable at a lower temperature (of up to about 120° C.).

On the other hand, aqueous coating compositions have aquired a greater importance from the viewpoint of air pollution control and savings in resources. The crosslinking agent used in these compositions is primarily water-soluble melamine resin, which, however, poses problems in respect of curability and the properties of coatings formed. Further conventional blocked isocyanate crosslinking agents are difficult to use in aqueous coating compositions.

An object of the present invention is to provide a novel process for preparing a self-curing resin free of the foregoing drawbacks.

Another object of the present invention is to provide a novel process for preparing a self-curing resin which can be prepared by fully polymerizing the component monomers without gelation or coloration and which is curable at a low temperature and suited to use in aqueous coating compositions.

These and other objects of the present invention will become apparent from the following description.

The present invention provides a process for preparing a self-curing resin having a blocked isocyanate group and a hydroxyl group in the molecule from a polymer 500 to 50000 in number average molecular weight and having a tertiary amino group and/or a quaternary ammonium group, and at least two isocyanate groups in the molecule, the process comprising the steps of partly blocking the isocyanate groups in the skeleton of the polymer, and reacting the remaining unblocked isocyanate groups with an alkanolamine to introduce hydroxyl groups into the polymer.

We have conducted intensive research to overcome the drawbacks of the conventional self-curing resin described above and found the following novel facts.

(1) A novel self-curing resin can be prepared from a polymer having a specified molecular weight and having a tertiary amino group and/or a quaternary ammonium group, and at least two isocyanate groups in the molecule, by blocking some of the isocyanate groups in the skeleton of the polymer, and thereafter reacting an alkanolamine with the remaining isocyanate groups to introduce hydroxyl groups into the polymer.

(2) The resin can be prepared by the process without gelation, coloration or a reduction in polymerization degree.

(3) The resin can be made curable at a low temperature of up to 120° C.

(4) The resin is a cationic self-curing resin which is soluble or dispersible in water.

The present invention has been accomplished based on these novel findings.

A detailed description will be made of the production process and use of the self-curing resin of the present invention.

The resin of the invention is prepared from polymers which are 500 to 50000 in number average molecular weight and which have at least one tertiary amino groups and/or at least one quaternary ammonium group, and at least two isocyanate groups in the molecule. (These polymers will hereinafter be referred to as "NCO polymers.") Among these NCO polymers, those containing a tertiary amino group and prepared, for example, from a polymerizable unsaturated monomer containing a tertiary amino group (hereinafter referred to as the "amine monomer"), a polymerizable unsaturated monomer containing an isocyanate group (hereinafter referred to as the "NCO monomer") and other polymerizable monomer free from active hydrogen (hereinafter referred to as "other monomer"), by copolymerizing these monomers.

First, the amine monomer is a compound having at least one tertiary amino group and at least one polymerizable unsaturated bond in the molecule. Examples of amine monomers are dimethylaminoethyl (meth)acrylate, diethylaminoethyl (meth)acrylate or the reaction product of a secondary amine and an epoxy-containing monomer such as glycidyl (meth)acrylate. Examples of secondary amines are diethylamine, dipropylamine, dibutylamine, methylbutylamine and the like.

The NCO monomer is a compound having a least one free isocyanate and at least one polymerizable unsaturated bond in the molecule. Examples of such compounds are methacryloyl isocynate, 2-isocyanate ethyl methacrylate, m- or p-isopropenyl-$\alpha,\alpha'$-dimethylbenzyl isocyanate and addition product of a hydroxyl-containing vinyl monomer with a diisocyanate compound in the mole ratio of 1:1. One or at least two of these compounds are usable. Among these, preferable to use are m- or p-isopropenyl-$\alpha,\alpha'$-dimethylbenzyl isocyanate and 2-isocyanate ethyl methacrylate.

The other monomer is a polymerizable monomer free from active hydrogen which easily reacts with isocyanate groups. Examples of such monomers are styrene, $\alpha$-methylstyrene, vinyltoluene and like aromatic vinyl monomers; methyl (meth)acrylate, ethyl (meth)acrylate, butyl (meth)acrylate, 2-ethylhexyl (meth)acrylate, lauryl (meth)acrylate, tridecyl (meth)acrylate, stearyl (meth)acrylate, cyclohexyl (meth)acrylate, benzyl (meth)acrylate and like (meth)acrylic acid esters; VISCOCE 3F, VISCOCE 3MF, VISCOCE 8F and VISCOCE 8MF (all brand names for products of OSAKA ORGANIC CHEMICAL INDUSTRY LTD.), perfluorocyclohexyl (meth)acrylate, N-2-propylperfluorooctanesulfonic acid amide ethyl (meth)acrylate, vinyl fluoride, vinylidene fluoride and like fluorine-containing vinyl monomers; N,N'-diethyl (meth)acrylamide and like nitrogen-containing vinyl monomers; vinyl ethyl ether, vinyl butyl ether and like vinyl ether monomers; and glycidyl (meth)acrylate; 3,4-epoxycyclohexylmethyl (meth)acrylate, arylglycidyl ether, alkyletherified methylolacrylamide, (meth)acrylamide, (meth)acrylic acid chloride, vinyl chloride, vinylidene chloride, (meth)acrylonitrile, $\gamma$-methacryloxyalkyltrimethoxysilane, etc. These monomers are used singly, or at least two of them are used in admixture, as suitably selected in accordance with the desired properties.

The ratio of the component monomers of the NCO polymers is such that the polymer has at least one tertiary amino group and at least two isocyanate groups in the molecule. More specifically, based on the combined amount of the three monomers, it is desired that the polymer comprise 3 to 30 wt. %, preferably 5 to 15 wt. %, of the amine monomer, 5 to 60 wt. %, preferably 20 to 55 wt. %, of the NCO monomer, and 92 to 10 wt. %, preferably 75 to 30 wt. % of the other monomer.

The NCO polymer is produced by copolymerizing the component monomers in a water-free inert organic solvent.

The term "inert organic solvent" refers to a solvent not having an functional group (such as hydroxyl, amino or carboxyl group) reactive with the isocyanate group. Examples of such solvents are aliphatic hydrocarbon, aromatic, ester and ketone and like organic solvents. These solvents are used singly, or at least two of them are used in admixture.

When the resin of the present invention is to be used for aqueous coating compositions, the organic solvent for use in the copolymerization is preferably a hydrophilic or water-soluble solvent, such as diethylene glycol dimethyl ether or ethylene glycol dimethyl ether. Also useful are N-methyl-2-pyrrolidone, dimethylformamide, methyl cellosolve acetate and the like. When these hydrophilic solvents contain water, it is desirable to remove the water before use.

When these organic solvents are used for the polymerization, the resulting reaction mixture can be diluted as it is with water.

On the other hand, when an NCO copolymer is synthesized in a water-insoluble organic solvent, the obtain copolymer can be converted into an aqueous system by removing the most or the whole of the solvent through distillation under reduced pressure or spray-drying, and dissolving or dispersing the powder in water or in a mixture of water and hydrophilic organic solvent. Alternatively, an aqueous system can be also produced as by an azeotropic method.

Examples of water-insoluble organic solvents usable in this case are toluene, xylene, methyl ethyl ketone, methyl butyl ketone, methyl isobutyl ketone, methyl amyl ketone, diethyl ketone, ethyl butyl ketone, ethyl acetate, butyl acetate, isobutyl acetate, amyl acetate, cellosolve acetate, carbitol acetate, heptane, cyclohexane and the like.

The reaction to copolymerize the component monomers into the NCO polymer is conducted usually at a temperature of about 50 to about 180° C. in the presence of a radical polymerization initiator. The molecular weight is adjusted by controlling, for example, the concentration of reaction system or the amount of initiator. The reaction is conducted generally at a concentration of about 20 to about 80 wt. % calculated as the concentration of the resulting polymer.

Examples of useful radical polymerization initiators are benzoyl peroxide, lauroyl peroxide, caproyl peroxide, tert-butyl peroctoate, diacetyl peroxide and like organic peroxides; azobisisobutyronitrile, azobis-$\alpha,\gamma$-dimethylvaleronitrile, dimethyl-$\alpha,\alpha'$-azoisobutyrate and like azo catalysts; diisopropyl peroxycarbonate and like dialkyl peroxydicarbonate; and redox initiators.

The concentration of the polymerization initiator is preferably in the range of about 0.01 to about 15 wt. %, more preferably 0.1 to 10 wt. %, based on the combined amount of the monomers.

Instead of using the polymerization initiator, electron rays or ultraviolet rays are usable. Ion polymerization or group transfer polymerization can be resorted to.

The copolymerization reaction is conducted usually at a temperature of about 50° to about 180° C., whereas when isopropenyl-$\alpha,\alpha'$-dimethylbenzyl isocyanate is used, it is desirable to conduct the reaction at a high temperature of at least 100° C. in the presence of a peroxide or carbonate initiator to achieve a higher polymerization degree. It is more preferable to use some amount of an acrylate monomer. The NCO polymer can then be obtained easily with a higher polymerization degree.

The NCO polymer is 500 to 50000, preferably 1000 to 30000, in number average molecular weight. If the molecular weight is lower than 500, the cured coating obtained with use of the polymer is lower in mechanical strength and weather resistance, whereas if it is higher than 50000, the polymer solution exhibits an exceedingly higher viscosity and becomes difficult to convert to an aqueous solution.

The NCO polymer containing a quaternary ammonium group is obtained by preparing a copolymer from a polymerizable unsaturated monomer containing a glycidyl group (hereinafter referred to as the "GMA monomer"), an NCO monomer and other monomer, and reacting a tertiary amine compound with the glycidyl group of the copolymer. The tertiary amine compound may be reacted with the copolymer after the copolymer has been blocked as will be described below or reacted with an alkanol amine. The GMA monomer is a compound having at least one glycidyl group and at least one polymerizable unsaturated bond in the molecule. Preferable as such monomers are, for example, glycidyl acrylate, glycidyl methacrylate and the like. Examples of useful tertiary amine compounds are trimethylamine, triethylamine, tributylamine and like $C_1$-$C_{17}$ alkyl amines, 2-dimethylaminoethanol, diethanolamine, triethanolamine, aminomethylpropanol, dimethylaminomethylpropanol and like alcohol amines, morpholines, etc. The proportion of the GMA monomer is preferably about 3 to about 30 wt. %, more preferably 5 to 15 wt. %, based on the combined amount of all the component monomers including NCO monomer and other monomer. The other monomer is used in the same proportion as already mentioned.

The NCO polymer may have a tertiary amino group and a quaternary ammonium group conjointly in the molecule.

The NCO polymer has a tertiary amino group and/or a quaternary ammonium group, and a free isocyanate group in the molecule but is free from any active hydrogen which is reactive with isocyanate groups.

According to the present invention, some of the free isocyanate groups present in the NCO polymer thus prepared are reacted with a blocking agent and thereby blocked. In other words, the NCO polymer resulting from the reaction of the blocking agent contains both the free unblocked isocyanate groups and the blocked isocyanate groups.

Examples of blocking agents are phenol, cresol, xylenol, p-ethylphenol, o-isopropylphenol, p-tert-butylphenol, p-tert-octylphenol, thymol, p-naphthol, p-nitrophenol, p-chlorophenol and like phenols; methanol, ethanol, propanol, butanol, ethylene glycol, methyl cellosolve, butyl cellosolve, methyl carbitol, benzyl alcohol, phenyl cellosolve, furfuryl alcohol, cyclohexanol and like alcohols; dimethyl malonate, diethyl malonate, ethyl acetoacetate and like active methylene compounds; butyl mercaptan, thiophenol, tert-dodecyl mercaptan and like mercaptans; acetanilide, acetanisidide, acetamide, benzamide and like acid amides; succinimide, maleimide and like imides; diphenylamine, phenylnaphthylamine, aniline, carbazole and like amines; imidazole, 2-ethylimidazole and like imidazoles; urea, thiourea, ethyleneurea and like ureas; phenyl N-phenylcarbamate, 2-oxazolidone and like carbamic acid salts; ethyleneimine and like imines; formaldoxime, acetaldoxime, methyl ethyl ketoxime, cyclohexanoneoxime and like oximes; sodium bisulfite, potassium bisulfite and like sulfites; ε-caprolactam, δ-valerolactam, γ-butyrolactam, β-propiolactam and like lactoms; etc. Especially preferable are phenol, lactam, alcohol and oxime blocking agents. When the blocking agent used is one which can be dissociated at a low temperature, the self-curing resin eventually obtained can be made curable at a low temperature.

The reaction of the blocking agent with the NCO polymer is conducted by admixing the blocking agent with a solution of the NCO polymer in a organic solvent and maintaining the mixture usually at a temperature of about 20° to about 150° C. When required, a tin catalyst may be used.

The amount of blocking agent to be used is determined by calculating the mole number of isocyanate groups to be blocked in accordance with the amount of hydroxyl groups to be introduced into the NCO polymer in the subsequent step. More specifically, the amount of blocking agent is preferably such that 5 to 95 mole %, more preferably 20 to 80 mole %, of all the free isocyanate groups present in the NCO polymer will be blocked.

Next, an alkanol amine is reacted with the unblocked isocyanate groups remaining in the NCO polymer thus partially blocked to thereby introduce hydroxyl groups into the NCO polymer, whereby the self-curing resin of the present invention is obtained.

Alkanol amines usable are primary or secondary amines. Examples of such amines are 2-(methylamino)ethanol, 2-(n-butylamino)ethanol, 2-(dodecylamino)ethanol, mono- or di-ethanolamine, diisopropanolamine, 4-piperidineethanol and like mono- or di-alkanol amines, among which 2-(methylamino)ethanol, diethanolamine, etc. are especially preferred.

The reaction of the alkanol amine with isocyanate groups, which proceeds at a very high velocity, is completed usually within a short period of time at room temperature. This reaction introduces both the functional groups (blocked isocyanate group and hydroxyl group) into the NCO polymer, so that if the reaction is effected at an excessively high temperature, the blocking agent is likely to dissociate partially to permit a reaction between the two functional groups, giving an increased viscosity to the reaction mixture or causing the gelation thereof. Accordingly, it is desired to conduct the reaction at a temperature of up to 70° C.

As a rule, it is desirable to use the alkanol amine in an amount required for the amine to react with all the unblocked isocyanate groups remaining in the blocked NCO polymer. When a dialkanol amine is used as selected from among other alkanol amines, hydroxyl groups can be introduced into the polymer in twice the amount attainable by a monoalkanolamine, hence an improved efficiency.

When the self-curing resin prepared from the NCO polymer according to the invention is adapted to contain equal amounts of blocked isocyanate and hydroxyl in the molecule, the self-curing coating formed with use of the resin will have the highest degree of crosslinking, whereas in the case where the resin is used for coating or adhesive compositions, it is desirable that one of the two functional groups be present in excess, for example, in view of the adhesion to the substrate or between layers. Stated more specifically, it is suitable that the resin have a hydroxyl value (mg KOH/g) of about 20 to about 250, and an isocyanate value (g/1000 g) of about 15 to about 250. The amine value is preferably in the range of about 25 to about 100 mg KOH/g although not limited specifically insofar as the self-curing resin of the invention can be dissolved or dispersed in water.

The self-curing resin of the present invention has in the molecule blocked isocyanate, hydroxyl, and tertiary amino and/or quaternary ammonium, each at least one in number. When the resin is heated, the blocking agent is dissociated to regenerate isocyanate groups, which react with hydroxyl groups for the resin to cure itself three-dimensionally. The heating temperature is not limited specifically provided that the blocking agent can be dissociated. Preferably, the temperature is at least 80° C. At room temperature, therefore, the resin is stable and will not cure itself.

The self-curing resin of the present invention can be used as dissolved or dispersed in an organic solvent. The resin content of the solution or dispersion is about 5 to about 95 wt. % calculated as solids. The resin has a tertiary amino group and/or a quaternary ammonium group in the molecule. When having the tertiary amino group, the resin is made soluble or dispersible in water by neutralization with an acid such as acetic acid, formic acid or lactic acid. It is therefore desirable to use the resin in the form of a aqueous composition (wherein an organic solvent may be present conjointly with water). In this case, the resin content of the composition is preferably about 5 to about 95 wt. % calculated as solids.

The self-curing resin has excellent storage stability and is useful for coating and adhesive compositions and the like.

For coating use, pigments, fillers, surface adjusting agents, deterioration preventing agents, etc. are admixed, as desired, with the resin to prepare a coating composition of the single pack type. It is also possible to use in combination with the resin a polyol (e.g., acrylic resin, polyester resin or fluorocarbon resin), reactive diluent and crosslinking agent (e.g., melamine resin, block isocyanate, epoxy, polybasic or alkoxysilane crosslinking agent). Curing catalysts are also usable.

Examples of useful curing catalysts are triethylamine, N,N-dimethylcyclohexylamine and like monoamines; N,N,N',N'-tetramethylethylenediamine, N,N,N',N'-tetramethylpropan-1,3-diamine, N,N,N',N'-tetramethylhexane-1,6-diamine and like diamines; N,N,N',N'',N''-pentamethyldiethylenetriamine, N,N,N',N'',N'' -pentamethyldipropylenetriamine, tetramethylguanidine and like triamines; triethylenediamine, N,N'-dimethylpiperazine, N-methyl-N'-(2-dimethylamino)ethylpiperazine, 1,2-dimethylimidazole and like cyclic amines; stannous octoate, dibutyltin diacetate, dibutyltin dilaurate, dibutyltin mercaptide, dibutyltin maleate, lead naphthenate and like organic metal compounds; etc.

The coating composition and adhesive composition comprising the self-curing resin of the invention are cured at a temperature of about 50° to about 200° C., preferably about 80° to about 150° C. to give a three-dimensionally crosslinked product.

In preparing the NCO polymer of the present invention, the reaction system for polymerizing the NCO monomer is free from any polymerizable monomer or solvent having active hydrogen and therefore undergoes no gelation. According to the invention, the blocking agent to be reacted with the NCO polymer needs to be heated only to a temperature required for the reaction with isocyanate groups, so that the blocking agent, for example, of the phenol or oxime type which is susceptible to coloration at high temperatures need not be heated to a high temperature but can be reacted with isocyanate groups for blocking at a temperature of not higher than about 100° C. This obviates any likelihood of coloration. Moreover, the blocking agent dissociates at a low temperature (of up to about 100° C.) and is therefore advantageous for curing the resin at low temperatures. Further even if the blocking agent used has a hi9h dissociation temperature, the agent readily reacts with the NCO polymer free of any gelation. Since the present resin contains a tertiary amino group and/or a quaternary ammonium group, the resin can be easily formulated into an aqueous composition, which is usable also as a cationic electrophoretic coating composition.

The present invention will be described in greater detail with reference to the following examples and comparative examples, whereas the invention is in no way be limited by these examples.

As a rule, the parts and percentages in the examples and comparative examples are by weight.

EXAMPLE 1

Methyl ethyl ketone (65 parts) was placed into a reactor equipped with a stirrer, reflux condenser and thermometer and maintained at 80° C. by heating. To the ketone were added dropwise over a period of 3 hours 40 parts of 2-isocyanate ethylmethacrylate, 15 parts of styrene, 30 parts of n-butyl methacrylate, 7 parts of 2-ethylhexyl methacrylate, and a mixture of 8 parts of dimethylaminoethyl methacrylate and 2.5 parts of azobis-α, γ-dimethylvaleronitrile.

Subsequently, a mixture of 35 parts of methyl ethyl ketone and 0.5 part of azobisisobutyronitrile was added dropwise to the mixture over a period of 1 hour, followed by aging for 1 hour and then by cooling to 30° C. The polymer formed in the reaction mixture was about 9000 in number average molecular weight. (The reaction mixture will be referred to as "NCO polymer solution (1).")

With further stirring, 11.2 parts of methyl ethyl ketoxime (blocking agent) was added dropwise to a portion of the mixture over a period of 15 minutes, followed by aging for 1 hour. Next, 9.7 parts of 2-(methylamino)ethanol was added dropwise to the resulting mixture over a period of 15 minutes, followed by aging for 30 minutes and completion of the reaction.

Methyl ethyl ketone (75 parts) was removed from the resulting mixture in a vacuum for concentration, and 3.1 parts of acetic acid was then added to the concentrate to neutralize the tertiary amino groups. The resulting mixture was then diluted with 75 parts of ion-exchanged water. The aqueous resin dispersion obtained was a slightly yellowish transparent liquid containing 54% of solids and having a Gardner viscosity of P and exhibited no increase in viscosity after having been stored at 30° C. for 1 month. The resin had a hydroxyl value of 72.3 mg KOH/g resin and an isocyanate value of 54.2 g/1000 g resin. To the aqueuos dispersion was added 0.2 parts by weight of dibutyltin dilaurate per 100 parts by weight of the resin solids, but the dispersion exhibited good storage stability.

EXAMPLE 2

Under the same conditions as in Example 1, 14.9 parts of methyl ethyl ketoxime was added to a portion of NCO polymer solution (1) obtained in Example 1 to block ⅔ of the quantity of isocyanate groups. To convert the remaining unblocked isocyanate groups to hydroxyl groups, 6.5 parts-of 2-methylamino)ethanol was added to the mixture, and the reaction was completed. The same procedure as in Example 1 was thereafter repeated. The resin dispersion (containing 54% of solids) was a slightly yellowish transparent liquid, had a Gardner viscosity of M and exhibited no increase in viscosity after having been stored at 30° C. for 1 month.

The resin was 48.2 in hydroxyl value and 72.2 in isocyanate value (same units as in Example 1). The aqueous dispersion exhibited good storage stability even when 0.2 part by weight of a tin catalyst was added as done in Example 1.

EXAMPLE 3

Methyl cellosolve acetate (30 parts) was placed into a reactor equipped with a stirrer, reflux condenser and thermometer and maintained at 130° C. by heating. To the acetate was added dropwise over a period of 3 hours a mixture of 50 parts of m-isopropenyl-α,α'-dimethylbenzyl isocyanate, 30 parts of n-butyl methacrylate, 12 parts of 2-ethylhexyl methacrylate, 8 parts of 2-diethylaminoethyl methacrylate and 3.5 parts of tert-butyl peroxyisopropyl carbonate.

A mixture of 5 parts of methyl ethyl ketone and 1.0 parts of tert-butyl peroxyisopropyl carbonate was then added dropwise to the mixture, followed by aging for 1 hour and then by cooling to 30° C. The polymer in the reaction mixture was about 6500 in number average molecular weight. (The reaction mixture will be referred to as "NCO polymer solution (2).")

Methyl ethyl ketoxime (10.8 parts) was then added dropwise to a portion of the mixture at 60° C. over a period of 15 minutes with stirring, followed by aging for 2 hours. Subsequently, 9.3 parts of 2-(methylamino)ethanol was added dropwise to the mixture over a period of 15 minutes, followed by aging for 30 minutes to complete the reaction.

The reaction mixture was neutralized with 3.0 parts of acetic acid, and 65 parts of ion-exchanged water was added to the mixture with stirring.

The resin dispersion (containing 55% of solids) obtained was a slightly yellowish milky white liquid, had a Gardner viscosity of P and exhibited no increase in viscosity after having been stored at 30° C. for 1 month.

The resin had a hydroxyl value of 69.7 mg KOH/g resin and an isocyanate value of 52.2 g/1000 g resin.

To the dispersion was added 0.2 parts by weight of dibutyltin dilaurate per 100 parts by weight of resin solids, but the dispersion exhibited good storage stability.

EXAMPLE 4

Under the same conditions as in Example 3, 14.4 parts of methyl ethyl ketoxime was added to a portion of NCO polymer solution (2) to block ⅔ of the quantity of isocyanate groups. To convert the remaining ⅓ quantity of isocyanate groups to hydroxyl groups, 8.7 parts of diethanolamine was added to the mixture, and the reaction was completed.

The same procedure as in Example 3 was thereafter repeated. The aqueous resin dispersion (containing 55% of solids) was a slightly yellowish milky white liquid, had a Gardner viscosity of O and exhibited no increase in viscosity after having been stored at 30° C. for 1 month.

The resin was 93.0 in hydroxyl value and 69.6 in isocyanate value (same units as in Example 3).

EXAMPLE 5

Methyl ethyl ketoxime (11.2 parts) was added dropwise to a portion of NCO polymer solution (1) obtained in Example 1 over a period of 15 minutes with stirring., and the mixture was aged for 1 hour. Subsequently, 9.7 parts of 2-(methylamino)ethanol was added dropwise to the mixture over a period of 15 minutes, followed by aging for 30 minutes to complete the reaction to obtained a resin dispersion of the invention which had a solids content of 54%. To this dispersion was added 0.2 part by weight of dibutyltin dilaurate per 100 parts by weight of the resin solids, but the dispersion exhibited good storage stability.

EXAMPLE 6

Methyl ethyl ketoxime (10.8 parts) was added dropwise to a portion of NCO polymer solution (2) of Example 3 at 60° C. over a period of 15 minutes with stirring, followed by aging for 2 hours. Subsequently, 9.3 parts of 2-(methylamino)ethanol was added dropwise to the mixture over a period of 15 minutes, followed by aging for 30 minutes to complete the reaction to obtain a resin dispersion of the invention containing 80% of solids. Dibutyltin dilaurate was added to the dispersion in an amount of 0.2 part by weight per 100 parts by weight of the resin solids, but the dispersion exhibited good storage stability.

EXAMPLE 7

Methyl ethyl ketone (65 parts) was placed into a reactor equipped with a stirrer, reflux condenser and thermometer and maintained at 80° C. by heating. To the ketone was added dropwise over a period of 3 hours 40 parts of 2-isocyanate ethyl methacrylate, 15 parts of styrene, 30 parts of n-butyl methacrylate, 7 parts of 2-ethylhexyl methacrylate, 8 parts of glycidyl methacrylate and 2.5 parts of azobis-α,γ-dimethylvaleronitrile.

A mixture of 35parts of methyl ethyl ketone and 0.5 part of azobisisobutyronitrile was then added dropwise to the mixture over a period of 1 hour, followed by aging for 1 hour and by cooling to 30° C. The polymer in the reaction mixture was about 9000 in number average molecular weight. (The reaction mixture will be referred to as "NCO polymer solution (3)").

A methyl ethyl ketone oxime blocking agent (11.2 parts) was added dropwise to a portion of the mixture over a period of 15 minutes with stirring, followed by aging for 1 hour. Subsequently, 9.7 parts of 2-(methylamino)ethanol was added dropwise over a period of 15 minutes, followed by aging for 30 minutes.

The reaction mixture was heated to 70° C. and 1.0 part of deionized water was added. To the mixture were added 3.36 parts of acetic acid and 4.98 parts of N,N-dimethylaminoethanol, and maintained for 2 hours. Then the mixture was diluted with 133 parts of deionized water. The aqueous dispersion obtained was a transparent varnish liquid containing about 30% of solids. Then 100 parts of the methyl ethyl ketone was removed under reduced pressure, giving a water-soluble varnish liquid containing 42% of solids.

The liquid exhibited no increase in viscosity after having been stored for one month at 30° C. The resin had a hydroxyl value of 72.3 mg KOH/g resin and an isocyanate value of 54.2 g/1000 g resin. To the aqueous dispersion was added 0.2 part by weight of dibutyltin dilaurate per 100 parts by weight of the resin solids, but the dispersion exhibited good storage stability.

COMPARATIVE EXAMPLE 1

Methyl ethyl ketone (65 parts) was placed into a reactor equipped with a stirrer, reflux condenser and thermometer and maintained at 80° C. by heating. To the ketone was added dropwise over a period of 3 hours a mixture of 20 parts of 2-isocyanate ethyl methacrylate, 15 parts of styrene, 22 parts of n-butyl methacrylate, 15 parts of 2-hydroxyethyl acrylate, 20 parts of 2-ethylhexyl acrylate, 8 parts of dimethylaminoethyl methacrylate and 2.5 parts of azobis-α,γ-dimethylvaleronitrile. Although an attempt was thus made to prepare a polymer, the mixture gelled 30 minutes after the start of dropwise addition.

COMPARATIVE EXAMPLE 2

In Example 1, 2-(methylamino)ethanol was added to NCO polymer solution (1) before the addition of methyl ethyl ketoxime thereto. The solution gelled 1 hour thereafter.

Property Test Results

Dibutyltin dilaurate serving as a catalyst was added to each of the resin dispersions of Examples 1 to 7 in the amount of 0.2 part per 100 parts of the resin solids. These resin dispersions and the resin dispersions of the examples as prepared with no catalyst added thereto were tested for storage stability. These dispersions were applied to tinplate sheets to a thickness of about 60 μm when dried, and the coatings were baked at 120° C. or 140° C. for 30 minutes and then checked for gel graction ratio. Table 1 shows the results.

TABLE 1

| Example | Catalyst | Gel fraction ratio (%) Baking at 120° C. | Gel fraction ratio (%) Baking at 140° C. | Storage stability |
|---|---|---|---|---|
| 1 | Present | 92 | 94 | Good |
|   | Absent  | 69 | 92 | Good |
| 2 | Present | 91 | 93 | Good |
|   | Absent  | 64 | 91 | Good |
| 3 | Present | 94 | 96 | Good |
|   | Absent  | 59 | 94 | Good |
| 4 | Present | 90 | 96 | Good |
|   | Absent  | 59 | 94 | Good |
| 5 | Present | 92 | 94 | Good |
|   | Absent  | 69 | 92 | Good |
| 6 | Present | 94 | 96 | Good |
|   | Absent  | 59 | 94 | Good |
| 7 | Present | 93 | 93 | Good |
|   | Absent  | 61 | 94 | Good |

The dispersion was evaluated as having good storage stability as listed in Table 1 when the increase in the viscosity of the dispersion resulting from storage at 30° C. for 1 month corresponded to not greater than two-stage increase (two standard tubes) as determined by a Gardner-Holdt bubble viscometer (20° C.). For the determination of the gel fraction ratio, the coating was subjected to extraction with acetone at the reflux temperature for 7 hours.

We claim:

1. A process for preparing a self-curing resin having a blocked isocyanate group and a hydroxyl group in the molecule from a polymer 500 to 50000 in number average molecular weight and having a tertiary amino group and/or a quaternary ammonium group, and at least two isocyanate groups in the molecule, the process comprising the steps of partly blocking the isocyanate groups in the skeleton of the polymer, and reacting the remaining unblocked isocyanate groups with an alkanolamine to introduce hydroxyl groups into the polymer.

2. A process as defined in claim 1 wherein about 5 to about 95 mole % of all the free isocyanate groups present in the polymer are blocked.

3. A process as defined in claim 1 which has a hydroxyl value of about 25 to about 250 mg KOH/g and an isocyanate value of about 15 to about 250 g/1000 g.

4. An aqueous composition prepared by neutralizing the self-curing resin obtained by the process of claim 1 with an acid or the like when so required and dissolving or dispersing the resin in water or in a mixture of water and an organic solvent.

* * * * *